United States Patent Office 2,900,836
Patented Aug. 25, 1959

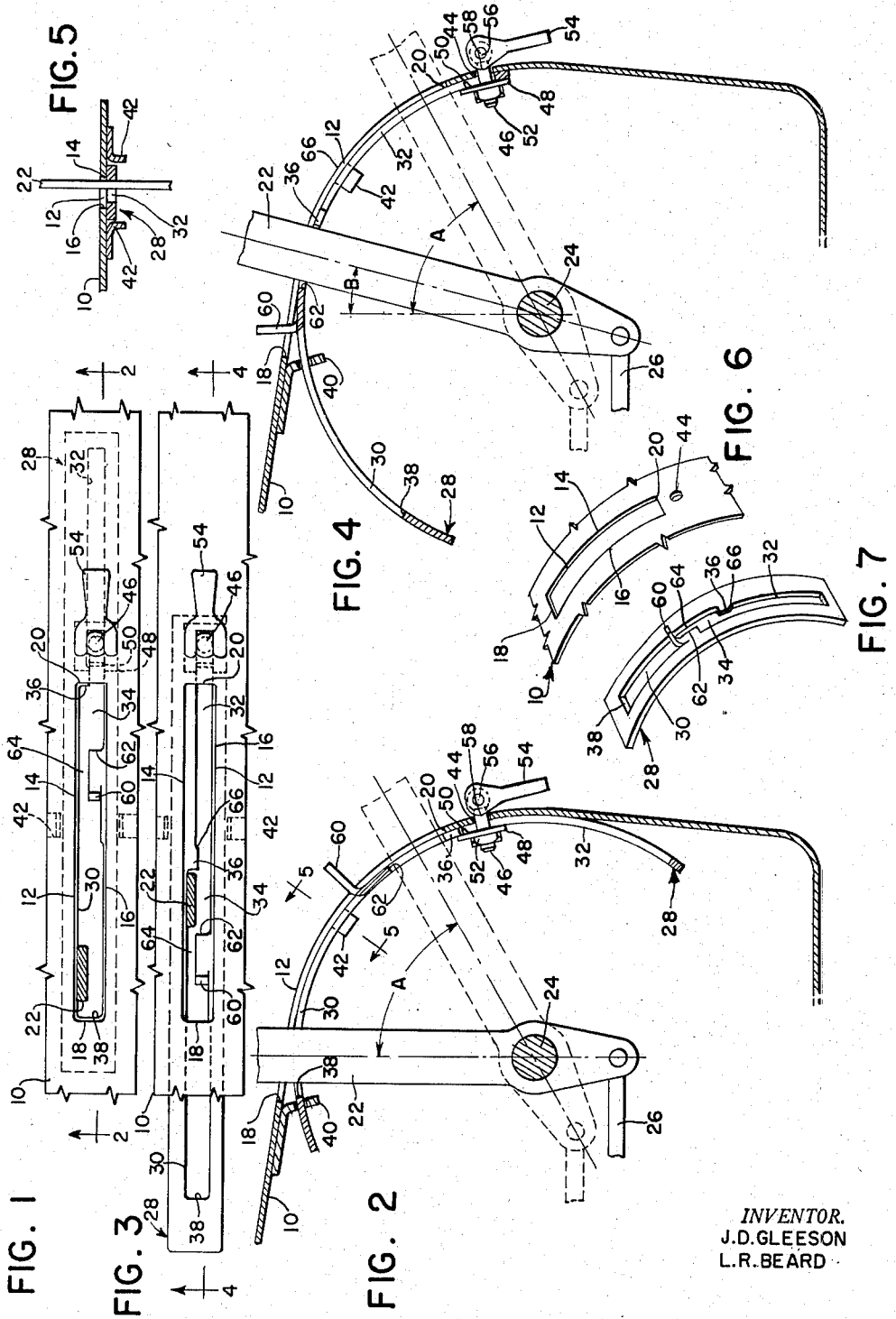

2,900,836

CONTROL MECHANISM

John D. Gleeson and Lawrence R. Beard, Waterloo, Iowa, assignors to Deere & Company, Moline, Ill., a corporation of Delaware Application September 5, 1958, Serial No. 759,292

16 Claims. (Cl. 74—469)

This invention relates to control mechanism and more particularly to improved means for regulating the positionable characteristics of a control lever as respects the ability thereof to move through a normal range or portions of said range, with provision for overtravel beyond any one of a plurality of selected positions within the range.

The invention finds particular utility in a hydraulic control system for agricultural tractors and implements of the so-called position-responsive type, one example of which is disclosed in the U.S. patent to Worstell 2,477,710. In the agricultural tractor and implement environment, the tractor is equipped with a hydraulic power system which includes a fluid motor for adjusting an associated implement. In a system such as that disclosed in the Worstell patent, the control lever manipulates a valve for activating and deactivating the fluid motor, and the position of the control lever is an indication of the position of the implement controlled by the motor. This results from the fact that in such system the control lever when initially moved opens the valve to activate the fluid motor and when the implement or other part connected to the motor moves a distance proportional to the amount of movement of the control lever, mechanism returns the valve to neutral, and the control lever maintains the initial position.

The control lever has a maximum control range of fixed length, but it often is desirable to use less than the entire range, for example, in fixing a plowing depth less than maximum. Accordingly, it has heretofore been known to utilize a stop selectively settable at a position corresponding to the depth of the plow, and to move the control lever from its inactive position to the position determined by the stop. It is often just as desirable to override the stop, so that the control lever can be moved farther beyond the stop in its control range so as to increase the plowing depth. One way to do this is to release the stop for permitting additional movement of the control lever. Another way of accomplishing this is to provide means enabling the control lever to by-pass the stop. In order to eliminate guess work in the return of the control lever to the selected position at all times, it is desirable to utilize some means in which the stop may be by-passed in one direction and returned to in the opposite direction and that, accordingly, is one of the principal objects of the present invention.

It is a further significant feature of the invention to provide a control mechanism, of the general character indicated above, in which a control lever projects upwardly through a slotted support for fore-and-aft swinging, and to associate therewith a slotted regulating element incorporating a stop having provision for enabling the control lever to by-pass the stop. It is a further feature of the invention to provide in the regulating element means whereby the selected position, as determined by the stop, can be readily found upon return of the control lever after the control lever has been moved past the stop. Further objects of the invention reside in a simple and economical stop, one that can be readily incorporated in slotted support or cowl structures, means for readily adjusting the stop, means for readily securing the stop in any selected position, and means incorporated in the regulating element giving the operator a desired amount of "feel" or indication as to the status of the control lever.

The foregoing and other important objects and desirable features inherent in and encompassed by the invention will become apparent to those versed in the art as a preferred embodiment of the invention is disclosed, by way of example, in the following detailed description and accompanying sheet of drawings, the several figures of which are described immediately below.

Fig. 1 is a plan "developed" view of the control mechanism in a condition permitting normal maximum-range movement of the control lever.

Fig. 2 is a section on the line 2—2 of Fig. 1, shown in its true relation.

Fig. 3 is a view similar to Fig. 1 but showing an adjusted position of the regulating element.

Fig. 4 is a section on the line 4—4 of Fig. 3, shown in its true relation.

Fig. 5 is a section on the line 5—5 of Fig. 2.

Fig. 6 is a fragmentary perspective of a portion of the slotted support.

Fig. 7 is a perspective of the slotted regulating element, drawn to a reduced scale, as in Fig. 6.

The position-responsive hydraulic control mechanism referred to above as exemplified by the Worstell patent is merely representative of the several environments in which the invention may find utility. However, in the interests of clarity and convenience, the present structure will be described with a position-responsive hydraulic system in mind, and certain directional expressions, such as "front," "rear," etc., will be employed for convenience.

The numeral 10 represents a support, here a sheet metal housing or cowl structure adapted to be mounted on a tractor or equivalent structure. This support has therein an elongated fore-and-aft slot 12 having right and left hand sides 14 and 16 and front and rear ends 18 and 20, respectively. The expressions "right" and "left" are used with reference to the position of an operator seated behind the support 10 and facing forwardly.

A control lever or member 22 is suitably carried by the support, as by a rockshaft 24, for fore-and-aft swinging through a maximum control range having, for example, a fixed angular length A substantially coterminous with the fore-and-aft length of the support slot 12. The lower end of the control lever may be connected in any suitable manner, as by a link 26, to an operating element, such as a hydraulic valve as disclosed in the above identified Worstell patent. Considered simply as being movable through the confines of the slot 12, the lever 22 is thus operative in its maximum range and positioning thereof within said range depends largely upon selection by the operator without any guide therefor. According to the present invention, the guess-work is eliminated by the utilization of a regulating element, indicated in its entirety by the numeral 28 and here comprising an arcuate strip conforming to the arcuate shape of the support 10 in which the slot 12 is formed.

This element is juxtaposed relative to the support 10, lying beneath the support and here having a length somewhat less than that of a semi-circle; although, dimensions such as these may be varied according to the control ranges involved. The element has therein a fore-and-aft slot made up of a forward slot portion 30 a rearward slot portion 32 and an intervening by-pass portion 34. The by-pass portion 34 affords an interconnecting junction between the forward and rear portions 30 and 32 and in this area the element is shaped to afford a first lateral stop 36. This stop projects laterally from the right hand edge of the element slot and only partially bridges the lateral width of the slot so as to establish the by-pass slot 34.

As best seen in Figs. 1 and 2, the width of the support slot 12 is considerably greater than the lateral thickness of the lever 22, and this relationship also exists between the thickness of the lever 22 and the width of the major portions of the slot portions 30 and 32. In the preferred example illustrated, inherent bias in the lever 22 causes it to ride to the right, thus occupying only the right hand side of the support slot 12 and the registering forward slot portion 30 of the element 28. The lever 22 may, however, be forcibly moved laterally for purposes of traveling through the by-pass portion 34, as will presently appear. Because of the bias in the lever 22, it may be considered as being normally confined to a normal path of movement through its maximum control range of the fixed length A. This will be clear from Fig. 1 in which it will be noted that the lever 22 can be moved fore and aft between the front and rear ends 18 and 20 of the support slot 12, and may likewise be moved between the forward end 38 of the element front slot portion 30 and the front edge of the element stop 36. In other words, in the position of the element 28, as shown in Figs. 1 and 2, the forward slot portion 30 is substantially coextensive with the support slot 12, and the rear slot portion 32 extends idly beneath the unslotted support portion behind the slot 12.

The element 28 is carried by the support 10 for fore-and-aft adjustment between the position of Fig. 1 and any of a plurality of forward position, typical of which is that shown in Figs. 3 and 4. For this purpose, the forward under portion of the support 10 carries an apertured guide or ear 40 through which the forward portion of the element 28 is loosely but accurately guided. An intermediate portion of the support 10 carries a pair of depending guides 42 (Fig. 5) which laterally confine an intermediate portion of the element 28. The support 10, rearwardly of the slot 12 and in fore-and-aft alinement therewith, has an aperture 44 (Fig. 6) in which is carried the shank of an eye-bolt 46 which serves as a guide for the rear part of the element 28 inasmuch as it passes loosely through the rear slot portion 32 of that element. A washer 48 is carried by the shank of the eye-bolt beneath the element 28 and has a tab or ear 50 bent up therefrom to fit loosely but accurately in the rear slot portion 32. A nut 52 is threaded on the eye-bolt 46 below the washer 48, and a swingable handle 54 is pivoted to the eye-bolt at 56 and is shaped as a cam at 58 to selectively clamp and release the element 28 as respects the support 10. It will be noted that the portion of the handle 54 that is joined to the eye-bolt at 56 is bifurcated so that the cam portions 58 operate at laterally opposite sides of the support aperture 44. When the handle 54 occupies the position shown in the drawings, the cam 58 causes a clamping action between the handle and the washer 48. When the handle 54 is rocked upwardly and forwardly, the cam portion 58 is removed and the clamping action is released, thereby permitting fore-and-aft adjustment of the element 28 relative to the support 10. This adjustment can be achieved, in this case, by handle means in the form of a tab 60 formed integral with the element by turning up a portion of the element bordering the front slot portion 30.

In the formation of the handle or tab 60, the element slot 30—34—32 is configured to afford, in addition to the stop 36, a second stop 62 which is located ahead of the stop 36 by substantially the fore-and-aft dimension of the control lever 22 and which projects from the opposite side of the by-pass slot 34. The lateral length of the stop 62 is such as to afford a passageway 64 through which the lever 22 may, in its normal path, pass the stop 62 for register with the by-pass portion 34, which position the lever 22 is shown as occupying in Figs. 3 and 4. In other words, with the element 28 adjusted forwardly to the position shown, the range of fore-and-aft movement of the lever 22, when confined to its normal path, is between the front edge 18 of the support slot 12 and the stop 36 on the element 28. As best seen in Fig. 4, this reduced range, identified at B, is considerably shorter than the maximum range A. However, because of the configuration of the slot 30—34—32, the lever 22 may be forced laterally to the left of its position of Fig. 3 into the by-pass portion 34, thus clearing the stop 36 and being capacitated to move rearwardly to the rear end of the support slot 12 via the rear element slot portion 32. Thus, the element 28 may be set to select a reduced portion of the maximum range A through which the lever 22 is movable in its normal path, and the by-pass portion 34 enables the selected position to be overtraveled in desired instances. In all cases, the maximum range is available although a smaller portion of that range may be preselected.

Another feature of the invention is that the element 28 is used as the means for guiding the member 22 along its normal path, which will be best seen in Figs. 1 and 3 wherein it will be noted that the lever 22 rides along the right hand edge of the element forward slot portion 30 rather than against the edge 14 of the support slot 12. The reason for this is that the element 28 may be more readily heat treated, for example, than the support 10, which may be part of an overall structure in which heat treatment is too costly or otherwise undesirable. Likewise, when the lever 22 enters the rear element slot portion 32, it runs along the right hand edge of that slot portion. At this point, the configuration of the right hand edge of the rear slot portion 32 should be noted, particularly its junction with the portion that affords the stop 36. As will be seen, the edge in question has an angular portion or cam 66 which is directed toward the left. The purpose of this is to provide feel or direction for the lever 22, when traveling in the rear slot portion 32, so that, when the operator moves the lever forwardly to return to either its forward or its selected stop position which has been overtraveled, the cam will deflect the lever and will thus inform the operator that he is reaching the by-pass portion 34. At this time, if the operator will maintain sufficient pressure on the lever to keep it to the left, the lever will engage the front stop 62 and thus will be located between the stop 62 and the stop 36, thus returning to the preselected position which has been overtraveled. This is a desirable feature inasmuch as, after overtravel has been obtained, the lever 22 may be returned to its preselected position without moving forwardly past that position and then back to its preselected position.

The operation of the mechanism is believed to be clear from the foregoing, but it may be well to review it briefly.

When the element 22 is in its rear position as shown in Figs. 1 and 2, normal maximum-range operation of the lever 22 is available, just as if the element were not present. That is to say, the lever 22 may be moved through its angular range A between the front and rear ends of the support slot 12. When a lesser range portion is desired, the clamp handle 54 is loosened and, by means of the handle 60, the element 28 is adjusted to the desired forward position, which may be readily achieved by first moving the lever 22 to the desired position as reflected by the implement or other part being actuated thereby and then bringing the element 22 into the proper location, thereafter securing its position by the clamp handle 54.

Assuming that the position of Figs. 3 and 4 has been selected, it will be noted that the lever 22, when following its normal path, is movable through the reduced range B between the front end 18 of the support slot 12 and the element stop 36. If rearward overtravel is desired, the lever 22 must be deflected to the left to enter the by-pass portion 34, after which it can be moved rearwardly to any desired extent in the rear element slot portion 32 within the confines set up by the rear end 20 of the support slot 12, which, of course, accords with the maximum range A. The operator, having found it necessary to resort to overtravel as discussed, will ultimately desire to return the lever 22 to the originally selected position, which he does by moving the lever 22 forwardly, the lever in this instance being guided by the right hand edge of the element rear slot portion 32. In this phase of operation, the lever will encounter the cam portion 66 and will be deflected to the left, which gives the operator the "feel" that he is approaching the desired position. As previously stated, if he maintains the pressure on the lever 22 to keep it to the left, the lever 22 will encounter the front stop 62 and therefore will be confined between stop 62 and the stop 36. He may thereafter remove pressure from the lever 22 and it will move to the right to remain confined in the selected position. For normal operating conditions in which the lever may be moved between the "on" position as selected (Fig. 3) and the "off" position (at the forward end of the slot 12), the selected range B will be sufficient for all practical purposes. Nevertheless, provision is made for overtravel as already described.

The regulating element is of novel construction, is simple and performs a plurality of functions. When the clamp handle 54 is loosened and the lever 22 is in the by-pass portion 34 and is held to the left, the lever itself may be used to move the element 28 forwardly. Likewise, when the element is already forwardly and the lever 22 remains in its normal path, it will engage the stop 36 and, with the clamp handle 54 loosened, may be used to move the element 28 rearwardly. In addition to this, the handle 60 affords additional means for manipulating the element 28.

Features of the invention not categorically enumerated will readily occur to those versed in the art, as will various modifications and alterations in the preferred embodiment disclosed, all of which may be achieved without departure from the spirit and scope of the invention.

What is claimed is:

1. Control mechanism, comprising: a support having a fore-and-aft slot including first and second opposite sides and front and rear ends; a control member projecting through the slot and movable fore and aft therein along a normal control path and through a control range generally coterminous with the ends of the slot, said member having a thickness less than the width of the slot; means biasing the member toward the first edge of the slot for movement of the member in its normal path but yielding to enable lateral displacement of said member toward the second edge of the slot and thus out of said normal path; a regulating element juxtaposed relative to the support and having a fore and aft slot through which the member extends, said element slot having a forward slot portion lying along the normal path of the control member and substantially equal in length to the support slot, a rear slot portion rearwardly beyond said forward slot portion and a by-pass slot portion laterally offset from said forward slot portion in the direction away from said normal path and affording a junction between said forward and rear slot portions, said element at said junction including a stop defining the rear end of said forward slot portion; means mounting the element on the support for fore and aft adjustment between a rear position in which the forward slot portion is generally coextensive with the support slot and any one of several forward positions in which the stop is advanced along the support slot to establish a rear limit on movement of the control member along its normal path and requiring lateral displacement of said member to pass through the by-pass slot portion for further rearward movement into the rear slot portion; and means for selectively securing said element in any of said positions.

2. The invention defined in claim 1, including: a second stop on the element ahead of the first mentioned stop by a distance generally equal to the fore-and-aft dimension of the member and projecting partially into the forward slot portion from the side opposite the first mentioned stop, said second stop being passable by the control member when moving in its normal path but adapted to be engaged by said member when returned forwardly from the rear slot portion.

3. The invention defined in claim 2, in which: the element provides a fore-and-aft rear edge at the side of the rear slot portion opposite the second stop and said edge includes a lateral cam part directed toward the second stop to compel the member, when moved forwardly in the rear slot portion, to shift laterally in the direction of said second stop.

4. The invention defined in claim 1, in which: the element provides a fore-and-aft rear edge along the rear slot portion for guiding the member and said rear edge has a cam portion just rearwardly of the stop for compelling the member, when moved forwardly in the rear slot portion, to shift laterally toward the by-pass slot portion.

5. The invention defined in claim 1, in which: the support has an aperture therein spaced rearwardly from and in fore-and-aft alinement with the rear end of the support slot; and the means mounting the element on the support includes a guide passed through said aperture and running in the rear slot portion of the element.

6. The invention defined in claim 5, in which: the guide is selectively clampable and releasable to clamp the element to the support or to release the element from the support and constitutes the means for selectively securing the adjusted positions of the element.

7. Control mechanism, comprising: a support; a control member movable fore and aft on the support along a normal control path and through a control range of fixed length; means biasing the member to follow its normal path but yielding to enable lateral displacement of said member out of said normal path; a regulating element juxtaposed relative to the support and having a fore-and-aft slot through which the member extends, said element slot having a forward slot portion lying along the normal path of the control member and substantially equal in length to the control range, a rear slot portion rearwardly beyond said forward slot portion and a by-pass slot portion laterally offset from said forward slot portion in the direction away from said normal path and affording a junction between said forward and rear slot portions, said element at said junction including a stop defining the rear end of said forward slot portion; means mounting the element on the support for fore-and-aft adjustment between a rear position in which the forward slot portion is generally coextensive with the control range and any one of several forward positions in which the stop is advanced along the control range and path to establish a rear limit on movement of the control member along its normal path and requiring lateral displacement of said member to pass through the by-pass slot portion for further rearward movement into the rear slot portion; and means for selectively securing said element in any of said positions.

8. The invention defined in claim 7, including: a second stop on the element ahead of the first mentioned stop by a distance generally equal to the fore-and-aft dimension of the member and projecting partially into the forward slot portion from the side opposite the first-mentioned stop, said second stop being passable by the control member when moving in its normal path but adapted to be engaged by said member when returned forwardly from the rear slot portion.

9. The invention defined in claim 8, in which: the element provides a fore-and-aft rear edge at the side of the rear slot portion opposite the second stop and said edge includes a lateral cam part directed toward the second stop to compel the member, when moved forwardly in the rear slot portion, to shift laterally in the direction of said second stop.

10. The invention defined in claim 7, in which: the element provides a fore-and-aft rear edge along the rear slot portion for guiding the member and said rear edge has a cam portion just rearwardly of the stop for compelling the member, when moved forwardly in the rear slot portion, to shift laterally toward the by-pass slot portion.

11. The invention defined in claim 7, including: handle means on the element for facilitating fore-and-aft adjustment thereof.

12. The invention defined in claim 1, in which: the element lies below the support and has handle means thereon projecting upwardly through the support slot for facilitating fore-and-aft adjustment of said element.

13. Control mechanism, comprising: a support; a control member carried by the support for fore-and-aft movement along a normal control path and through a maximum control range having front and rear ends; a regulating element having a stop projecting laterally into said path; means mounting the element on the support for fore-and-aft adjustment between a rear position in which said stop is at the rear end of said range and any one of a plurality of forward positions in which said stop is closer to the front end of said range; means for selectively setting the element in any of said positions; and means normally confining the member to said path but enabling forcible lateral shifting of said member so that said member can by-pass the stop in any of said forward positions for further movement rearwardly.

14. The invention defined in claim 13, including: a second stop on the element ahead of the first mentioned stop by an amount substantially equal to the fore-and-aft dimension of the member and projecting toward but short of the normal path of the member from the side opposite the first mentioned stop and adapted to be engaged by the laterally shifted member upon forward movement of the member after by-passing the first mentioned stop.

15. Control mechanism, comprising: a support; a control member carried by the support for fore-and-aft movement along a normal control path and through a maximum control range having front and rear ends; a regulating element having a stop projecting laterally into said path; means mounting the element on the support for fore-and-aft adjustment between a rear position in which said stop is at the rear end of said range and a forward position in which said stop is closer to the front end of said range; means for selectively setting the element in any of said positions; and means normally confining the member to said path but enabling forcible lateral shifting of said member so that said member can by-pass the stop in said forward position for further movement rearwardly.

16. The invention defined in claim 15 including: a second stop on the element ahead of the first mentioned stop by an amount substantially equal to the fore-and-aft dimension of the member and projecting toward but short of the normal path of the member from the side opposite the first mentioned stop and adapted to be engaged by the laterally shifted member upon forward movement of the member after by-passing the first mentioned stop.

References Cited in the file of this patent

UNITED STATES PATENTS

| | | |
|---|---|---|
| 2,015,553 | Exner | Sept. 24, 1935 |
| 2,054,741 | Davis | Sept. 15, 1936 |
| 2,427,804 | Mueller | Sept. 23, 1947 |
| 2,460,599 | Rowe | Feb. 1, 1949 |
| 2,664,762 | Morris | Jan. 5, 1954 |

FOREIGN PATENTS

| | | |
|---|---|---|
| 208,370 | Great Britain | Dec. 20, 1923 |